US009922755B2

(12) United States Patent
Matsui et al.

(10) Patent No.: US 9,922,755 B2
(45) Date of Patent: Mar. 20, 2018

(54) JOINT CONNECTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hajime Matsui, Mie (JP); Yasuo Omori, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/533,162

(22) PCT Filed: Dec. 7, 2015

(86) PCT No.: PCT/JP2015/084321
§ 371 (c)(1),
(2) Date: Jun. 5, 2017

(87) PCT Pub. No.: WO2016/104130
PCT Pub. Date: Jun. 30, 2016

(65) Prior Publication Data
US 2017/0345531 A1 Nov. 30, 2017

(30) Foreign Application Priority Data
Dec. 25, 2014 (JP) ................................. 2014-262172

(51) Int. Cl.
*H01B 11/12* (2006.01)
*H01R 13/436* (2006.01)
(Continued)

(52) U.S. Cl.
CPC ....... *H01B 11/125* (2013.01); *H01R 13/4361* (2013.01); *B60R 16/0215* (2013.01); (Continued)

(58) Field of Classification Search
CPC .............................. H01R 31/08; H01R 31/085
See application file for complete search history.

(56) References Cited

U.S. PATENT DOCUMENTS 5,061,196 A * 10/1991 Weston .................. H01R 31/08
439/189
5,433,628 A * 7/1995 Sadaishi .................. H01R 4/64
29/883

(Continued)

FOREIGN PATENT DOCUMENTS

JP 59-43671 12/1984
JP 60-31187 9/1985
(Continued)

OTHER PUBLICATIONS

International Search Report dated Mar. 1, 2016.

*Primary Examiner* — Ross Gushi
(74) *Attorney, Agent, or Firm* — Gerald E. Hespos; Michael J. Porco; Matthew T. Hespos

(57) ABSTRACT

In the process of mounting a joint terminal (5) into a first terminal accommodating portion (16) of a housing (15), tab terminals (6) of the joint terminal (5) move forward along tab entrance paths (26) formed in the housing (15). The tab entrance path (26) is formed with a cam portion (27) spiral about an axis thereof. As the tab terminal (6) moves forward in the tab entrance path (26), a follower portion (8) formed
(Continued)

at an intermediate position of the tab terminal (6) is guided by the cam portion (27). Thus, the tab terminal (6) is twisted about an axis. In this way, resilient contact pieces (14) of female terminals (9A, 9B) face the tab terminals (6) in a plate surface direction of the tab terminals (6) and are connected to the tab terminals (6).

5 Claims, 16 Drawing Sheets

(51) Int. Cl.
  *H01R 13/6463* (2011.01)
  *H01R 4/64* (2006.01)
  *B60R 16/02* (2006.01)
  *H01R 13/518* (2006.01)

(52) U.S. Cl.
  CPC ............ *H01R 4/646* (2013.01); *H01R 13/518* (2013.01); *H01R 13/6463* (2013.01)

(56) References Cited

U.S. PATENT DOCUMENTS

| | | | | |
|---|---|---|---|---|
| 5,769,650 | A * | 6/1998 | Aoyama | H01R 13/4365 439/189 |
| 5,788,519 | A * | 8/1998 | Stern | H01R 31/085 439/189 |
| 6,193,549 | B1 * | 2/2001 | Suzuki | H01R 13/4223 439/511 |
| 6,383,035 | B1 * | 5/2002 | Kasai | H01R 9/2458 439/724 |
| 6,431,880 | B1 * | 8/2002 | Davis | H01R 9/2491 439/76.2 |
| 6,447,331 | B1 * | 9/2002 | Fukatsu | H01R 31/08 439/511 |
| 6,840,820 | B2 * | 1/2005 | Oda | H01R 13/518 439/721 |
| 7,172,472 | B2 * | 2/2007 | Fujii | H01R 31/08 439/733.1 |
| 7,175,489 | B2 * | 2/2007 | Fujii | H01R 13/41 439/733.1 |
| 7,241,168 | B2 * | 7/2007 | Sakurai | H01R 31/08 439/511 |
| 7,435,132 | B1 * | 10/2008 | Fong | H01R 9/038 439/497 |
| 7,476,113 | B2 * | 1/2009 | Tamagawa | H01R 12/592 439/189 |
| 7,806,720 | B2 * | 10/2010 | Omori | H01R 9/03 439/507 |
| 7,883,362 | B2 * | 2/2011 | Ichio | H01R 13/40 439/511 |
| 7,990,738 | B2 * | 8/2011 | Urrea | H01H 85/12 361/833 |
| 8,025,538 | B2 * | 9/2011 | Hara | H01R 4/64 439/723 |
| 8,100,730 | B2 * | 1/2012 | Hara | H01R 4/64 439/721 |
| 8,105,103 | B2 * | 1/2012 | Nishio | H01R 4/305 439/287 |
| 8,257,111 | B1 * | 9/2012 | Smutny | H01R 13/5208 439/511 |
| 8,277,258 | B1 * | 10/2012 | Huang | H01R 31/08 439/497 |
| 8,388,364 | B2 * | 3/2013 | Kikuchi | H01R 13/08 439/251 |
| 8,454,378 | B2 * | 6/2013 | Osterhart | H01R 13/4223 439/284 |
| 8,690,607 | B2 * | 4/2014 | Tsukamoto | H01R 13/7193 439/620.09 |
| 8,992,251 | B2 * | 3/2015 | Smutny | H01R 31/08 439/511 |
| 9,083,094 | B2 * | 7/2015 | Teramoto | H01R 4/64 |
| 9,099,803 | B2 * | 8/2015 | Omori | H01R 13/5219 |
| 9,172,193 | B2 * | 10/2015 | Sakamoto | H01R 24/28 |
| 9,211,852 | B2 * | 12/2015 | Omori | H01R 4/64 |
| 9,318,827 | B2 * | 4/2016 | Osada | H01R 13/4223 |
| 9,356,362 | B2 * | 5/2016 | Miyawaki | H01R 4/34 |
| 9,362,665 | B2 * | 6/2016 | Omori | H01R 4/64 |
| 9,379,493 | B2 * | 6/2016 | Aizawa | H01R 13/6588 |
| 9,379,496 | B2 * | 6/2016 | Hashimoto | H01R 13/6625 |
| 9,653,858 | B2 * | 5/2017 | Hanke | H01R 11/32 |
| 9,692,183 | B2 * | 6/2017 | Phillips | H01R 13/6471 |
| 9,761,978 | B2 * | 9/2017 | Kim | H01R 13/14 |
| 2006/0128185 | A1 * | 6/2006 | Nakazawa | H01R 31/08 439/92 |
| 2006/0205270 | A1 * | 9/2006 | Sakurai | H01R 31/08 439/507 |
| 2007/0246241 | A1 * | 10/2007 | Peterson | H01R 4/185 174/74 R |
| 2010/0071953 | A1 * | 3/2010 | Ichio | H01R 13/40 174/72 A |
| 2011/0111639 | A1 * | 5/2011 | Hara | H01R 4/64 439/660 |
| 2012/0129392 | A1 * | 5/2012 | Fujisaki | H01R 13/521 439/587 |
| 2013/0303016 | A1 * | 11/2013 | Shimizu | H01R 13/4223 439/374 |
| 2013/0303023 | A1 * | 11/2013 | Miwa | H01R 13/506 439/620.05 |
| 2013/0309913 | A1 * | 11/2013 | Shimizu | H01R 13/405 439/660 |
| 2013/0316593 | A1 * | 11/2013 | Shimizu | H01R 13/641 439/660 |
| 2013/0330956 | A1 * | 12/2013 | Shimizu | H01R 13/4223 439/345 |
| 2014/0134869 | A1 * | 5/2014 | Hamai | H01R 13/111 439/345 |
| 2014/0187081 | A1 * | 7/2014 | Teramoto | H01R 4/64 439/527 |
| 2014/0220823 | A1 * | 8/2014 | Ando | H01R 13/6625 439/620.01 |
| 2014/0235090 | A1 * | 8/2014 | Omori | H01R 4/64 439/350 |
| 2014/0315410 | A1 * | 10/2014 | Omori | H01R 13/5219 439/271 |
| 2014/0364009 | A1 * | 12/2014 | Kondo | H01R 13/6625 439/620.09 |
| 2015/0004841 | A1 * | 1/2015 | Fujiwara | H01R 13/6625 439/620.21 |
| 2015/0113803 | A1 * | 4/2015 | Omori | B60R 16/0207 29/857 |
| 2015/0214658 | A1 * | 7/2015 | Nishiyama | H01R 13/4362 439/357 |
| 2015/0340790 | A1 * | 11/2015 | Hamai | H01R 13/4223 439/660 |
| 2017/0040731 | A1 * | 2/2017 | Nishiyama | H01R 13/41 |
| 2017/0250504 | A1 * | 8/2017 | Bang | H01R 13/631 |

FOREIGN PATENT DOCUMENTS

| | | |
|---|---|---|
| JP | 2009-176688 | 8/2009 |
| JP | 2014-82009 | 5/2014 |

* cited by examiner

JOINT CONNECTOR

BACKGROUND

1. Field of the Invention

The present invention relates to a joint connector.

2. Description of the Related Art

Japanese Unexamined Patent Publication No. 2009-176688 discloses an in-vehicle network called CAN installed in an automotive vehicle to communication with nodes (electronic control units) via a wiring harness constituting communication transmission paths.

A joint connector is used in Japanese Unexamined Patent Publication No. 2009-176688 to connect communication wires of a wiring harness. The joint connector has joint terminals, and each joint terminal has tabs projecting therefrom and mounted in upper and lower stages. Branch points of a main line are connected via female terminals or branch lines branched off from the main line are connected via the female terminals. Twisted pair cables are used as communication wires to be less affected by noise. One of these communication wires in each communication pair is connected to the joint terminal in one of the stages and the corresponding other communication wire is connected to the joint terminal in the other stage.

In the above-described joint connector, an interval between cavities for accommodating the respective terminals connected to the communication wires paired in the twisted pair cable is preferably as small as possible. If the interval is wide, an effect of noise reduction is impaired. As a countermeasure, it is thought to change the arrangement of locking lances formed in the cavities corresponding to the twisted pair cable such that a deflection direction (X direction) of the locking lances is perpendicular to an arrangement direction (Y direction) of the cavities. If these two directions are the same, a height of a deflection space for the locking lance is added to a height of an accommodation space of the cavity for the terminal and the interval between the cavities is increased by that much. Note that a resilient contact piece for connection to the corresponding tab terminal is formed in each female terminal, and a deflection direction thereof is the same as the deflection direction of the locking lance, i.e. X direction.

The respective tab terminals of the joint terminal are arranged in the X direction if the above-described countermeasure structure is adopted. Thus, each tab terminal contacts the resilient contact piece corresponding thereto in the arrangement direction thereof. Specifically, a fracture surface of each tab terminal formed when being cut out from a base material faces and contacts the resilient contact piece. However, this may cause the resilient contact piece to be damaged and the plating thereof to be peeled off when the terminals slide in contact with each other.

The present invention was completed based on the above situation and aims to provide a joint connector capable of protecting resilient contact pieces by preventing fracture surfaces of tab terminals from facing the resilient contact pieces even if a deflection direction of the resilient contact pieces is along an arrangement direction of the tab terminals.

SUMMARY

The invention is directed to a joint connector with a joint terminal formed with a coupling piece and tab terminals projecting in parallel from the coupling piece. Female terminals are configured such that the respective tab terminals are insertable therein. Each female terminal has a terminal connecting portion internally formed with a deflectable resilient contact piece to resiliently contact the tab terminal. A housing is formed with a first terminal accommodating portion that is configured so that the joint terminal is mountable therein and is formed with tab entrance paths into which the respective tab terminals are to be inserted. The housing also has a second terminal accommodating portion including cavities that coaxially face the corresponding tab entrance path. Each cavity is configured such that the female terminal is insertable therein and is formed internally with a deflectable locking lance to be resiliently locked to the corresponding female terminal. A deflection direction of the resilient contact pieces is the same as an arrangement direction of the tab terminals. Each tab terminal in the joint terminal is twisted about an axis thereof and a plate surface direction of each tab terminal is substantially perpendicular to that of the coupling piece and substantially the same as the deflection direction of the resilient contact pieces.

According to the joint connector of the invention, the respective female terminals are joined by connecting the female terminals inserted into the second terminal accommodating portion to the respective tab terminals of the joint terminal mounted into the first terminal accommodating portion. If the housing is structured such that the resilient contact piece of the female terminal contacts the tab terminal in a direction perpendicular to the plate surface direction, i.e. in a direction to face a fracture surface of the tab terminal, the resilient contact piece may be damaged by the fracture surface in the process of connection. However, according to the invention, even with such a housing structure, each tab terminal of the joint terminal is twisted about the axis to be substantially perpendicular to plate surfaces of the coupling piece. Thus, each tab terminal can contact the resilient contact piece of the female terminal in the plate surface direction. Therefore, the resilient contact piece can be reliably protected from damage and the like due to the fracture surface of the tab terminal.

Each tab terminal may be formed with a protruding follower portion. A cam portion spiral about an axis of the tab entrance path may be formed to communicate with each tab entrance path, and the cam portion may be formed to guide the follower portion, twist and deform each tab terminal about the axis thereof and be able to contact the resilient contact piece in the plate surface direction thereof as the joint terminal is mounted into the first terminal accommodating portion.

According to this configuration, when the joint terminal is mounted into the first terminal accommodating portion of the housing, each tab terminal is inserted along the tab entrance path and the follower portion formed on the tab terminal moves forward while being guided by a spiral path of the cam portion formed on the tab entrance path. A twisting force about the axis is applied to the tab terminal in this process. When the mounting of the joint terminal is completed, the plate surface direction of each tab terminal is substantially perpendicular to that of the coupling piece. As a result, the tab terminal contacts the resilient contact piece of the female terminal in the plate surface direction thereof. Since the plate surface direction of the tab terminal can be changed in linkage with the mounting operation of the joint terminal as described above, manufacturing efficiency can be enhanced as compared to the case where the tab terminals are twisted in advance with respect to the female terminals.

The cam portion may be formed to be able to restrict a returning movement of the tab terminal in a direction opposite to a twisting direction by bringing a surface of the follower portion on a side opposite to the twisting direction into contact with an inner surface of the cam portion when the joint terminal is mounted properly into the first terminal accommodating portion According to this configuration, there is no springback after the tab terminal is twisted. Thus, a variation of a twisting angle due to the springback can be avoided effectively.

At least two of the first terminal accommodating portions may be provided in the housing, and the joint terminal may be mounted into each of the first terminal accommodating portions. Pairs of the female terminals to be connected to the respective tab terminals of a pair of the joint terminals may be connected to twisted pair cables. The pairs of female terminals may be mounted into pairs of the corresponding cavities in at least a pair of the second terminal accommodating portions provided in the housing, and the deflection direction of the respective locking lances may be set along the arrangement direction of the respective cavities constituting the respective second terminal accommodating portions.

According to this configuration, the pairs of cavities for accommodating the pairs of female terminals connected to the twisted pair cables respectively belong to the pair of second terminal accommodating portions. The deflection direction of the locking lances arranged in these cavities is set along the arrangement direction of the respective cavities constituting the second terminal accommodating portions. That is, since the locking lances are not arranged in the arrangement direction of the pairs of the cavities for accommodating the pairs of female terminals connected to the twisted pair cables, intervals between these pairs of cavities can be narrowed. Thus, the pairs of female terminals can be accommodated with short intervals of the twisted pair cables kept, wherefore an effect of noise removal is not impaired.

DETAILED DESCRIPTION

Figure 1:
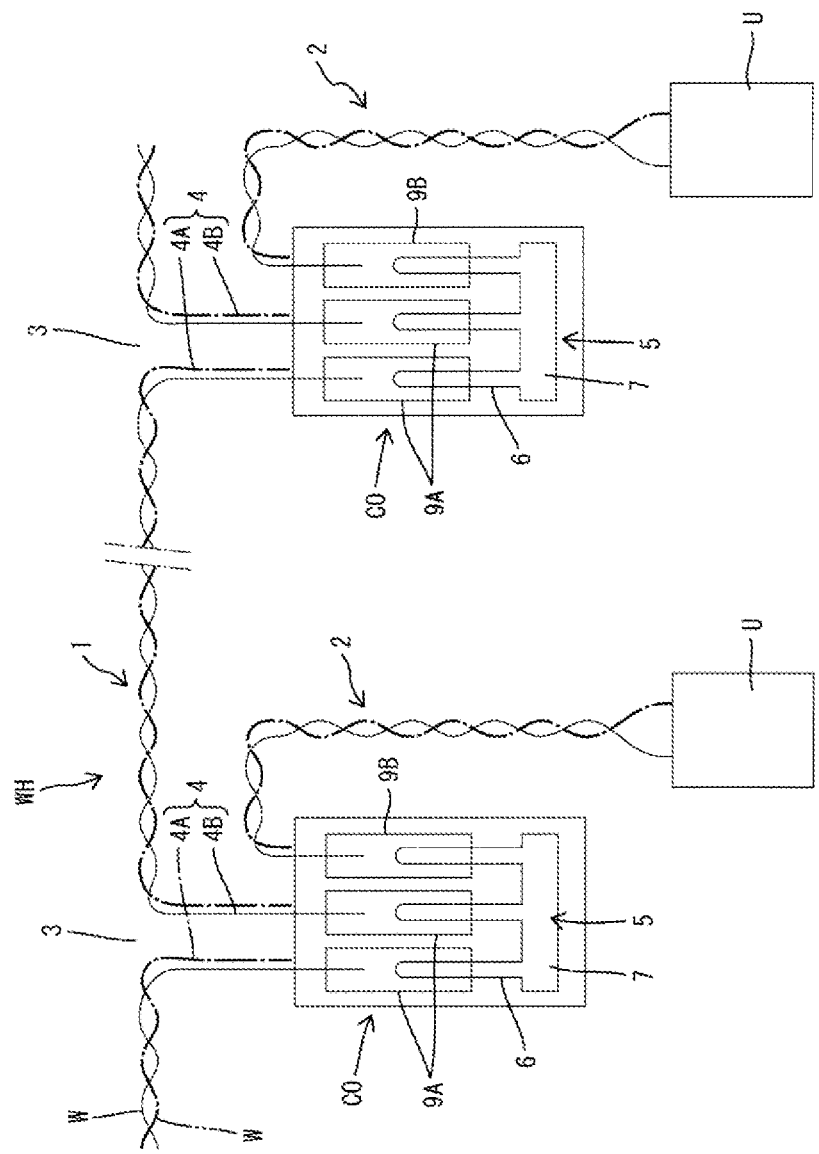
FIG. 1 is a diagram showing a part of an in-vehicle network.

Next, a specific embodiment of a joint connector of the present invention is described with reference to the drawings.
(Summary of In-Vehicle Network)
FIG. 1 shows a part of an in-vehicle network called CAN (Control Area Network) and a plurality of electronic control units U can communicate with each other via a wiring harness WH.

The wiring harness WH is composed of a main line 1 and branch lines 2 branched off from this main line 1 at a plurality of branch points 3 and connected to each electronic control unit U at each branch destination. Further, the main line 1 and each branch line 2 are formed by twisted pair cables formed by pairing and twisting two wires W.

Figure 5:
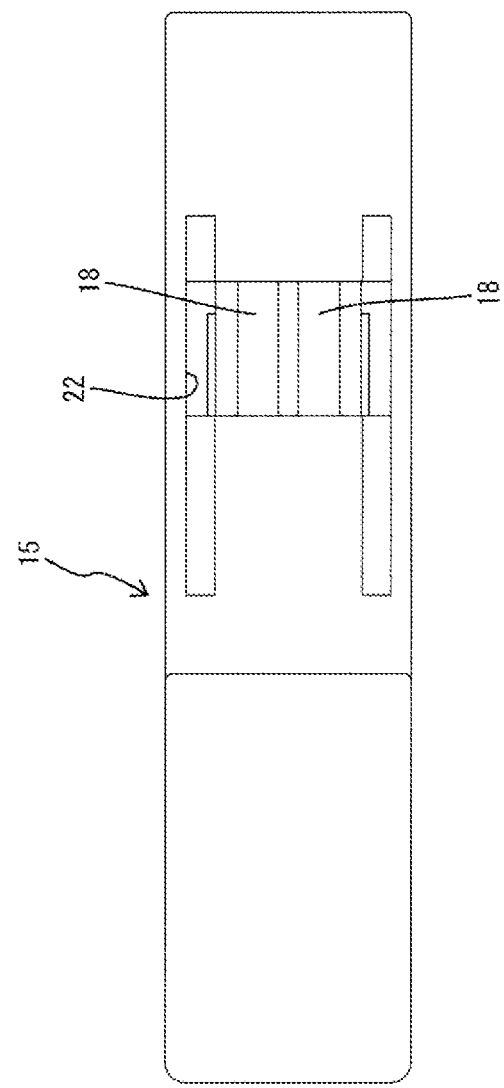
FIG. 5 is a bottom view of a housing.

The main line 1 is formed with bypath paths 4 toward joint connectors CO at the respective branch paths 3. A forward path 4A and a return path 4B in each bypass path 4 are relayed in the joint connector CO and branched off to each electronic control unit U.
(Joint Terminal: See FIG. 2)
Two joint terminals 5 shown in FIG. 5 are accommodated in the joint connector CO (only one joint terminal 5 is shown in FIG. 1). Each joint terminal 5 is made of conductive metal and formed to include three tab terminals 6 juxtaposed in a width direction and a coupling piece 7 in the form of a flat plate coupling end parts of these tab terminals 6. The paired wires W in the above twisted pair cable are respectively connected to the tab terminals 6 paired between the both joint terminals 5 via female terminals 9A, 9B.

A substantially rectangular follower portion 8 is formed to protrude on one side edge in a length direction of each tab terminal 6. A chamfered portion 8A with a curved surface is formed on a front edge part of each follower portion 8. The chamfered portion 8A makes entrance into a cam portion 27 to be described later smooth.

Figure 2:
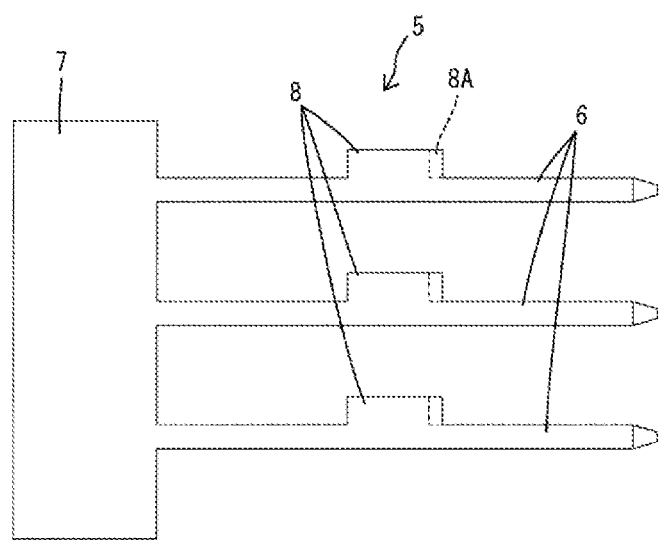
FIG. 2 is a plan view of a joint terminal.
Figure 3:
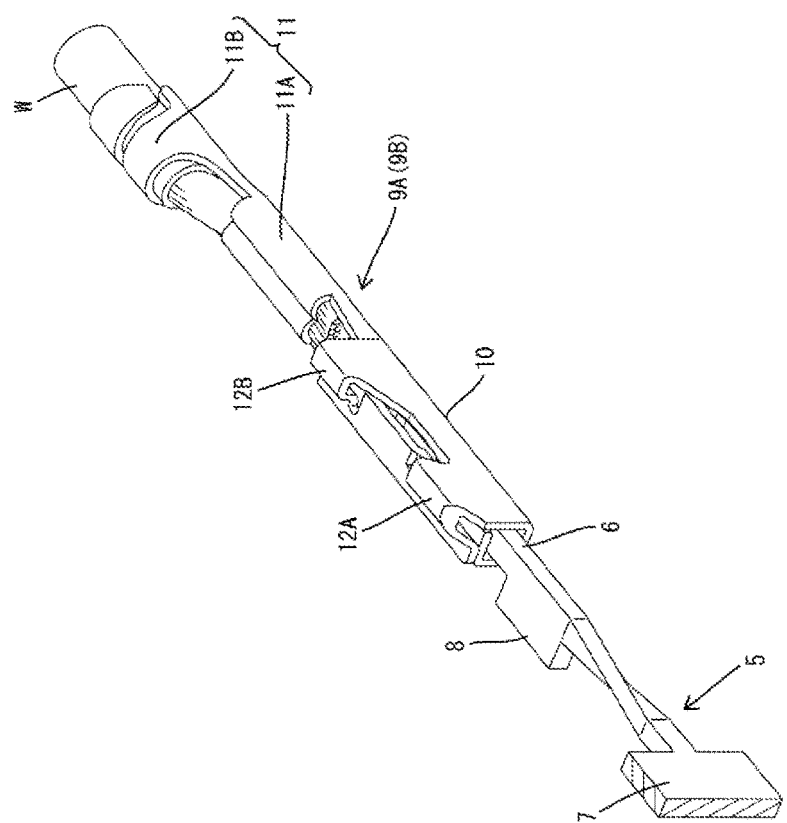
FIG. 3 is a perspective view showing a connected condition of the joint terminal and a female terminal after twisting.

The joint terminal 5 is formed by being punched out from a base material in the form of a flat plate by a press. Thus, both side edges of the tab terminals 6 are fracture surfaces. When the tab terminals 6 are punched out by the press, plate surfaces (both sides shown in FIG. 2) of each tab terminal 6 are flush with those of the coupling piece 7 as shown in FIG. 2. After being mounted into the joint connector CO, each tab terminal 6 is twisted about an axis thereof by 90° and the plate surfaces of the coupling piece 7 and those of the tab terminals 6 are substantially perpendicular to each other as shown in FIG. 3. This is described in detail later.
(Female Terminals: See FIG. 3)
The female terminals 9A, 9B used for the main line and the branch lines are identical. The female terminals 9A, 9B are also formed by being bent into a predetermined shape after a conductive metal plate material is punched out by a press. The female terminal 9A, 9B is composed of a terminal connecting portion 10 in the form of a rectangular tube into which the tab terminal 6 is insertable, and a wire connecting portion 11 arranged behind the terminal connecting portion 10. The wire connecting portion 11 is composed of a wire barrel 11A to be crimped to a core exposed at an end part of the wire (each wire constituting the twisted pair cable) and an insulation barrel 11B to be crimped to a coating part of the wire W.

The terminal connecting portion 10 is bent into a rectangular tube shape and a ceiling wall is a double wall. An outer surface side of the ceiling wall of the terminal connecting portion 10 is cut in a longitudinal middle part to have a single wall structure. A pair of protrusions 12A, 12B are formed to project at front and rear sides of this cut part on the outer surface side of the ceiling wall in the terminal connecting portion 10. The protrusions 12A, 12B function as stabilizers and the front protrusion 12A also functions to be locked to a locking lance 13 to be described later.

Figure 4:
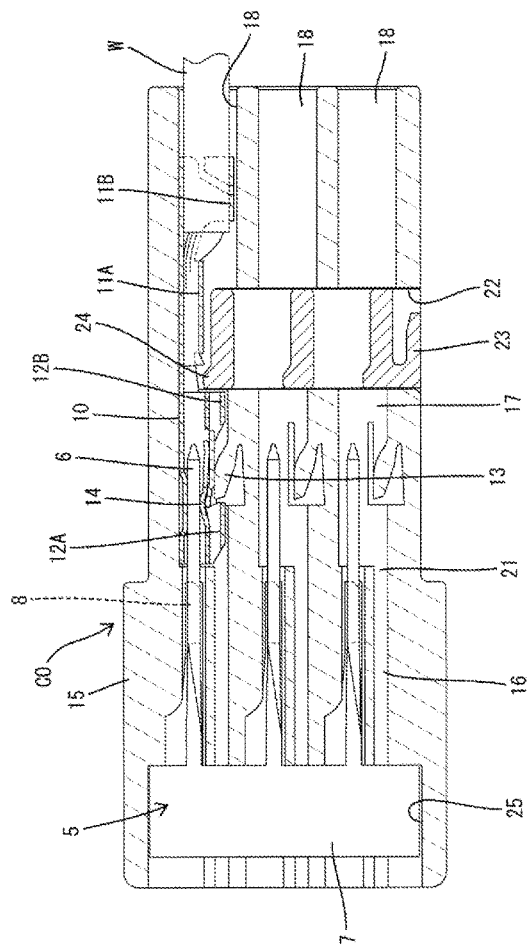
FIG. 4 is a section of a joint connector in a connected state of the joint terminal and the female terminals.

As shown in FIG. 4, a resilient contact piece 14 to be electrically connected to each tab terminal 6 of the joint terminal 5 is formed in the terminal connecting portion 10. As shown in FIG. 4, the resilient contact piece 14 is cantilevered rearward and can be deflected in a direction opposite to a projecting direction of the both protrusions 12A, 12B. In other words, the resilient contact piece 14 is deflected along a deflection direction (X direction: see FIGS. 4 and 6) of the locking lance 13.

(Housing of Connector: See Mainly FIGS. 4 to 8)

The housing 15 is made of synthetic resin and is formed internally with two first terminal accommodating portions 16 (accommodating portions located on a left side in the housing in FIG. 4 and only the first terminal accommodating portion 16 on one side is shown in FIG. 4) for accommodating two joint terminals 5 and two second terminal accommodating portions 17 (accommodating portions located on a right side in the housing 15 in FIG. 4 and only the second terminal accommodating portion 17 on one side is shown in FIG. 4) for accommodating a total of three pairs of female terminals (two pairs of main-line female terminals 9A and one pair of branch-line female terminals 9B). Each second terminal accommodating portion 17 is provided with a total of three cavities 18 for accommodating two main-line female terminals 9A and one branch-line female terminal 9B.

Figure 6:
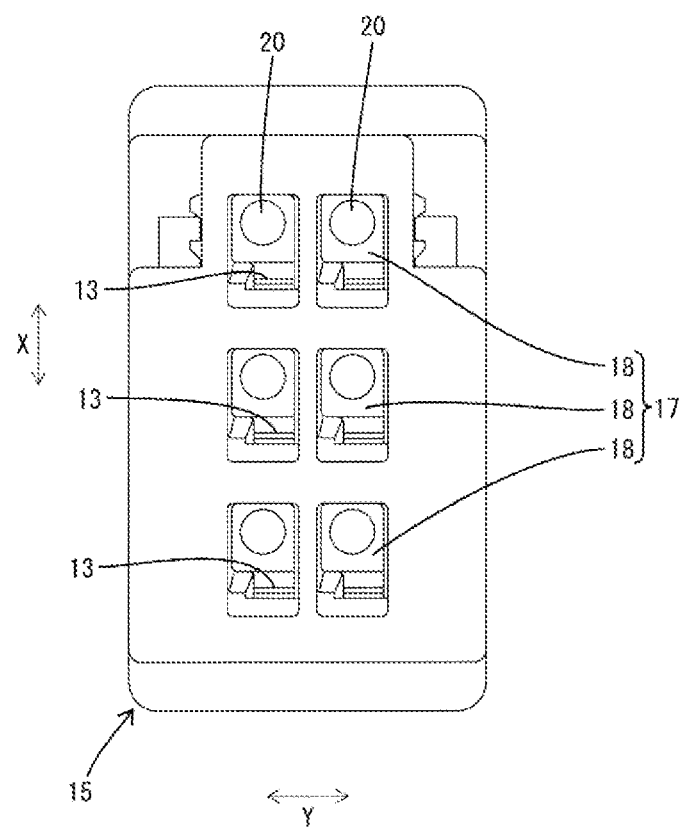
FIG. 6 is a right side view of the housing.

As shown in FIG. 6, two female terminals (main-line female terminal 9A and branch-line female terminal 9B) connected to the wires W constituting the twisted pair cable are accommodated in the cavities 18 juxtaposed in a lateral direction (Y direction in FIG. 6) in the pair of second terminal accommodating portions. As shown in FIG. 6, intervals in the Y direction between the cavities 18 constituting the respective second terminal accommodating portions 17 is narrower than intervals in the X direction.

As shown in FIG. 4, insertion holes 20 for allowing the tab terminals 6 to pass through and mold removal holes 21 for enabling mold removal toward the side of the first terminal accommodating portions 16 when the locking lances 13 are molded are open on boundary walls 19 between the respective second terminal accommodating portions 17 and the first terminal accommodating portions 16.

Each forwardly cantilevered locking lance 13 is arranged in a front part (part near the first terminal accommodating portion 16) in each cavity 18. Each locking lance 13 is formed to be deflectable along the X direction in FIG. 6. The locking lance 13 retains the female terminal 9A, 9B by resiliently locking the front protrusion 12A of the female terminal 9A, 9B.

As shown in FIG. 5, a retainer mounting hole 22 is open on one side surface of the housing 15. The retainer mounting hole 22 is formed to communicate with all the cavities 18. On the other hand, a retainer 23 to be mounted into this retainer mounting hole 22 is formed with locking projections 24 respectively lockable to the rear ends of the terminal connecting portions 10 of the respective female terminals 9A, 9B. Further, although not shown in detail, the retainer 23 is held at two positions, i.e. a partial locking position and a full locking position, with respect to the housing 15. At the partial locking position, each locking projection 24 waits outside an entrance path for the female terminal 9A, 9B, whereby each female terminal 9A, 9B is inserted freely into and withdrawn from the cavity 18. At the full locking position, each locking projection 24 projects into the entrance path for the female terminal 9A, 9B, thereby being lockable to the rear end of the terminal connecting portion 10.

Figure 7:
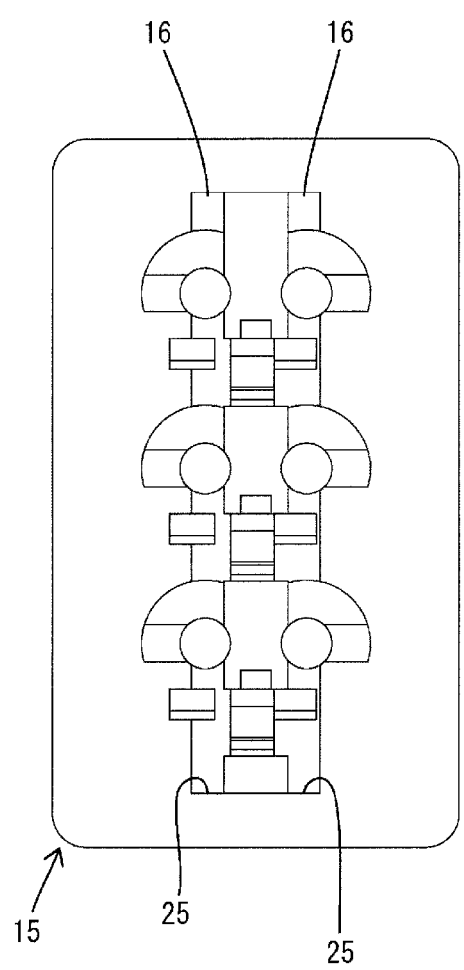
FIG. 7 is a left side view of the housing.
Figure 8:
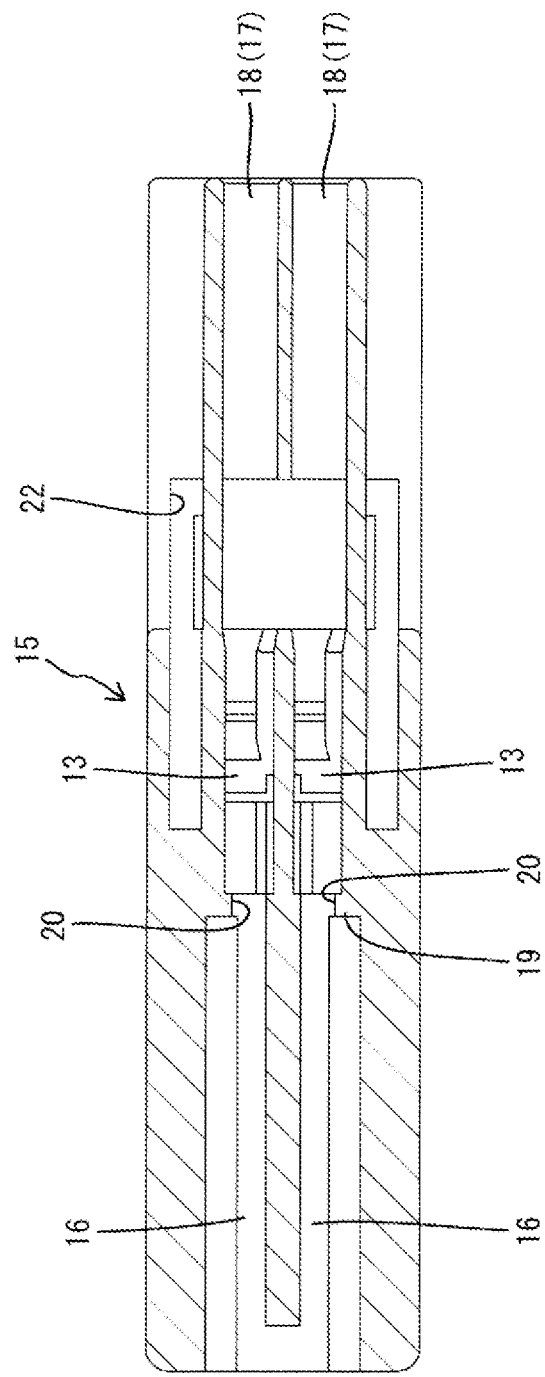
FIG. 8 is a plan view in section of the housing.
Figure 13:
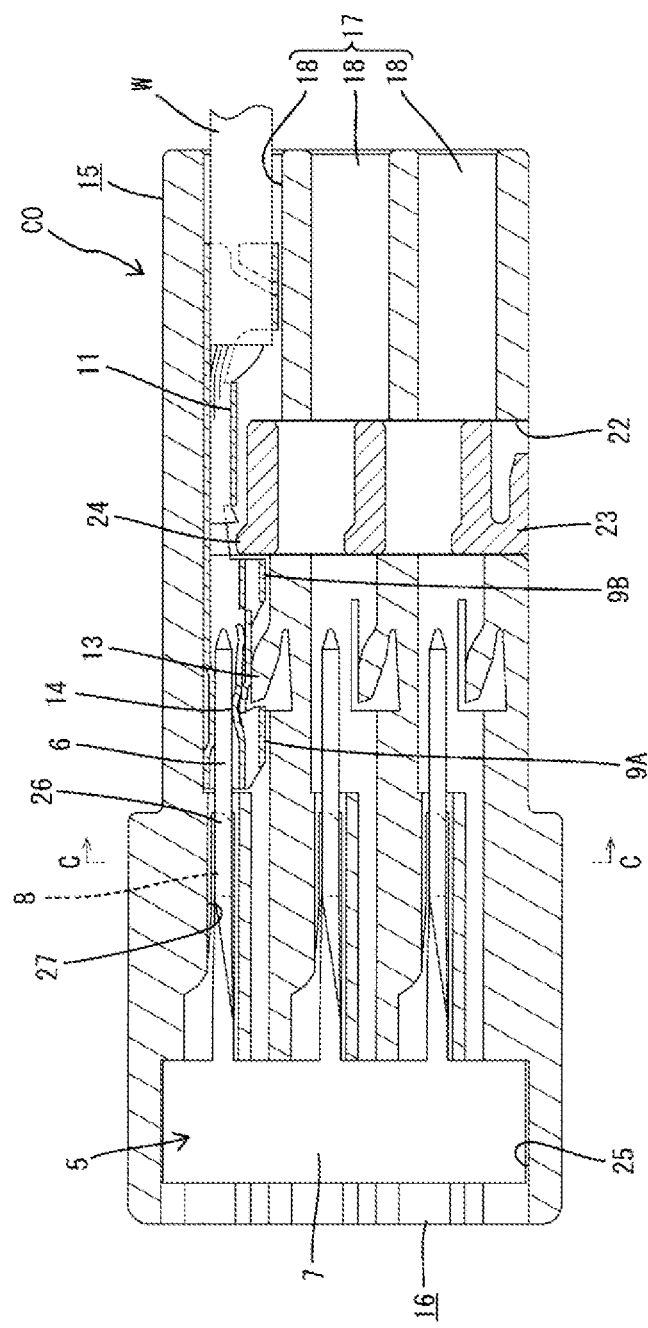
FIG. 13 is a front view in section showing a state where the joint terminal is inserted to a proper depth into the first terminal accommodating portion of the housing.

Next, the first terminal accommodating portions 16 are described. As shown in FIG. 7, the first terminal accommodating portions 16 are arranged in two rows along the Y direction. As shown in FIG. 13 and the like, a coupling piece accommodating portion 25 for accommodating the coupling piece 7 of the joint terminal 5 is formed in an entrance part of each of the first terminal accommodating portions 16. An opening width of the coupling piece accommodating portion 25 is slightly smaller than a width of the coupling piece 7 of the corresponding joint terminal 5. Thus, with the joint terminal 5 accommodated in the first terminal accommodating portion 16, the front end edge of the coupling piece 7 is butted against a back wall of the first terminal accommodating portion 16 and the coupling piece 7 is press-fit into the coupling piece accommodating portion 25 so that the coupling piece 7 is retained entirely.

Figure 9:
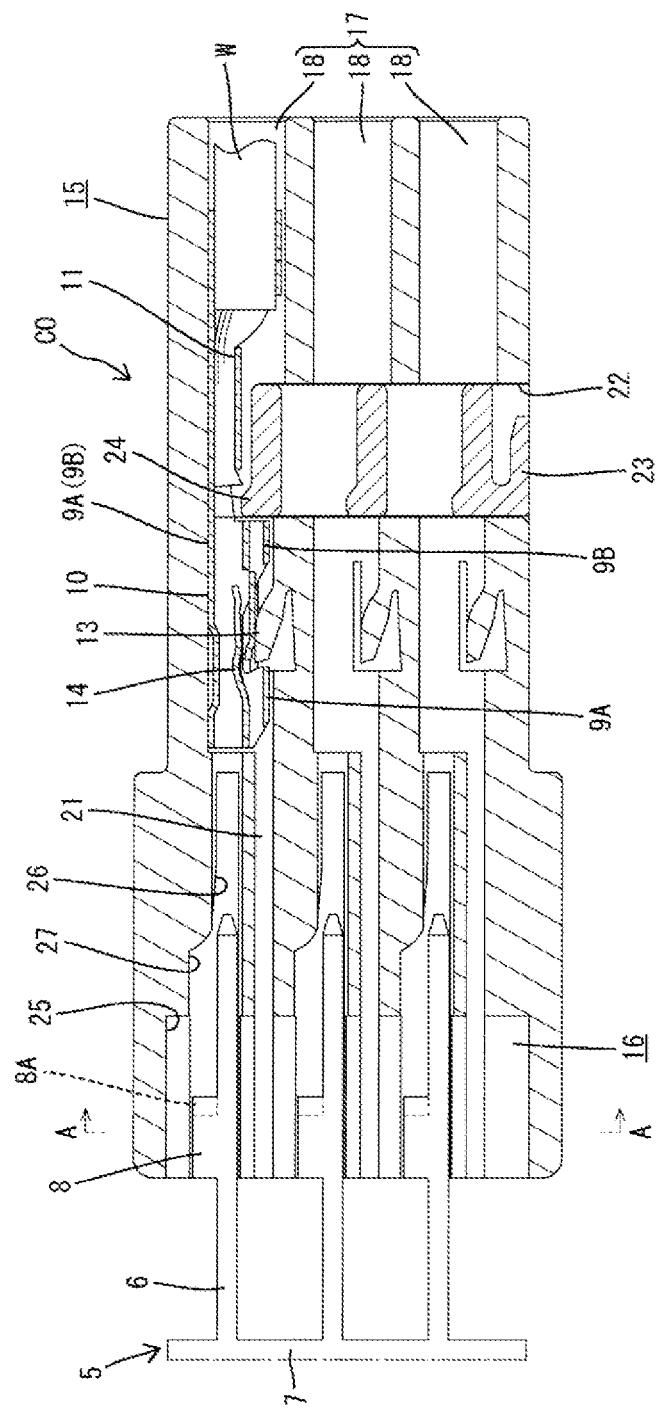
FIG. 9 is a front view in section showing a state where the joint terminal is shallowly inserted into a first terminal accommodating portion of the housing.
Figure 10:
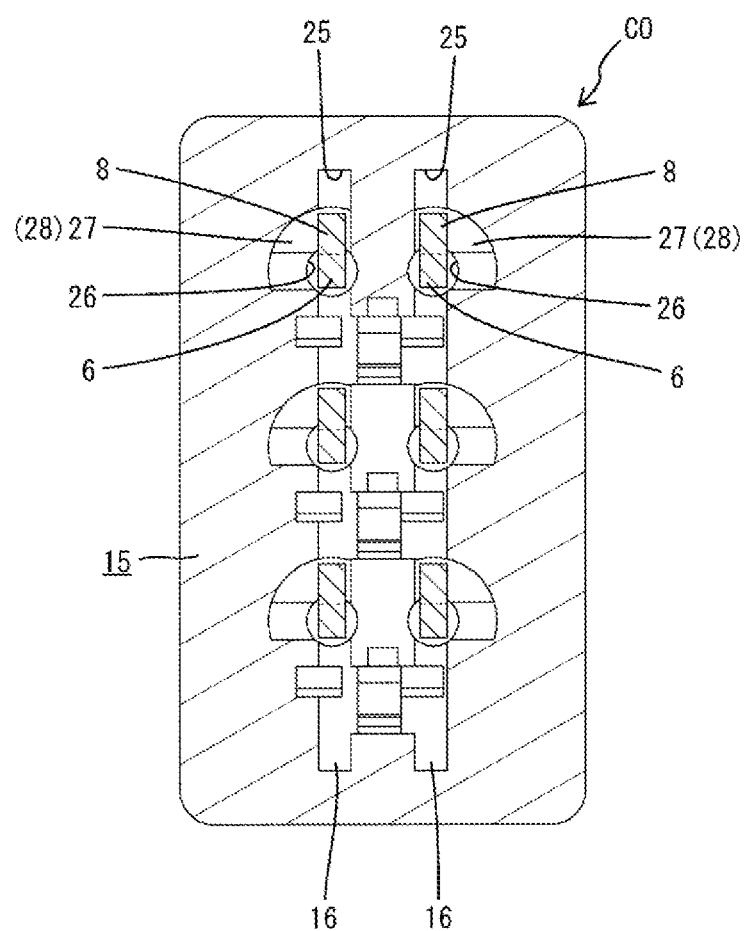
FIG. 10 is a section along A-A of FIG. 9.

As shown in FIGS. 7, 9 and 10, three tab entrance paths 26 are formed in parallel along the X direction in each of the first terminal accommodating portions 16, and the tab terminal 6 of the joint terminal 5 is insertable into each tab entrance path 26. Each tab entrance path 26 is formed straight along a front-rear direction and the tab terminal 6 of the joint terminal 5 is insertable therein. Each tab entrance path 26 is formed straight along the front-rear direction and substantially coaxial with the corresponding cavity 18. An entrance part of each tab entrance path 26 communicates with the coupling piece accommodating portion 25. The front end of each tab entrance path 26 is open on the boundary wall 9 as the aforementioned insertion hole 20. As shown in FIG. 7, the tab entrance path 26 is a substantially circular hole having a larger hole diameter than an outer diameter of the tab terminal 61.

Figure 15:
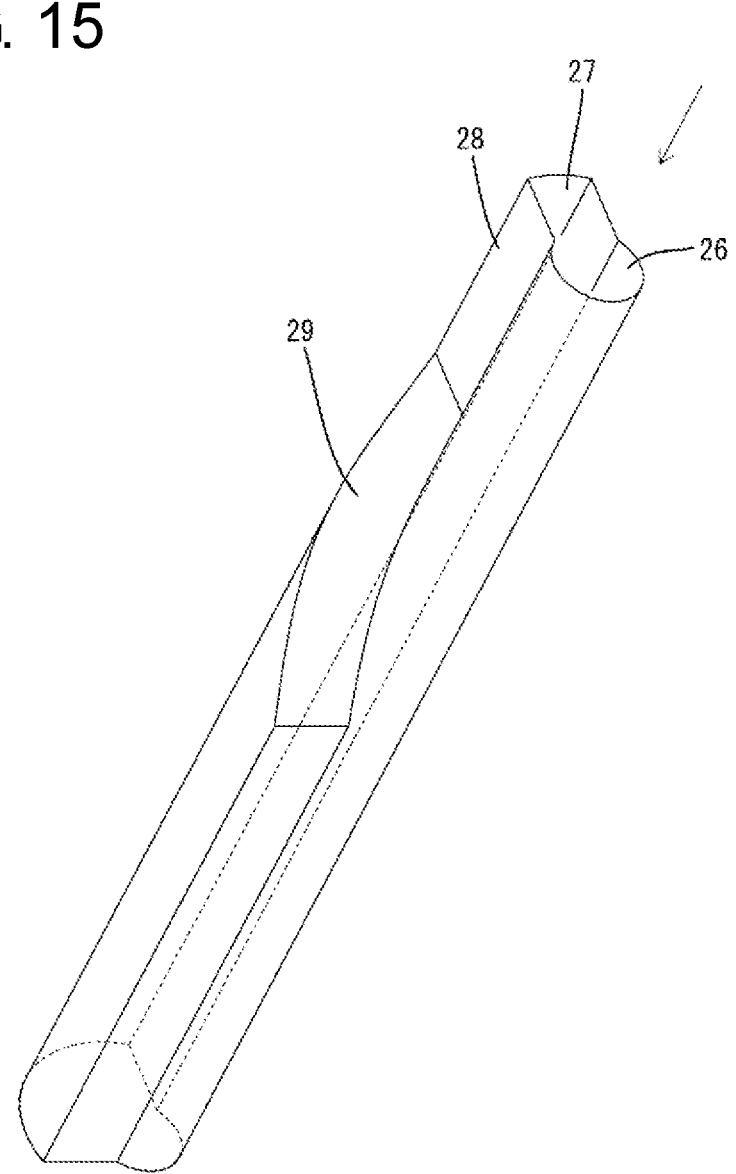
FIG. 15 is a perspective view schematically showing a tab insertion path and a cam portion.
Figure 16:
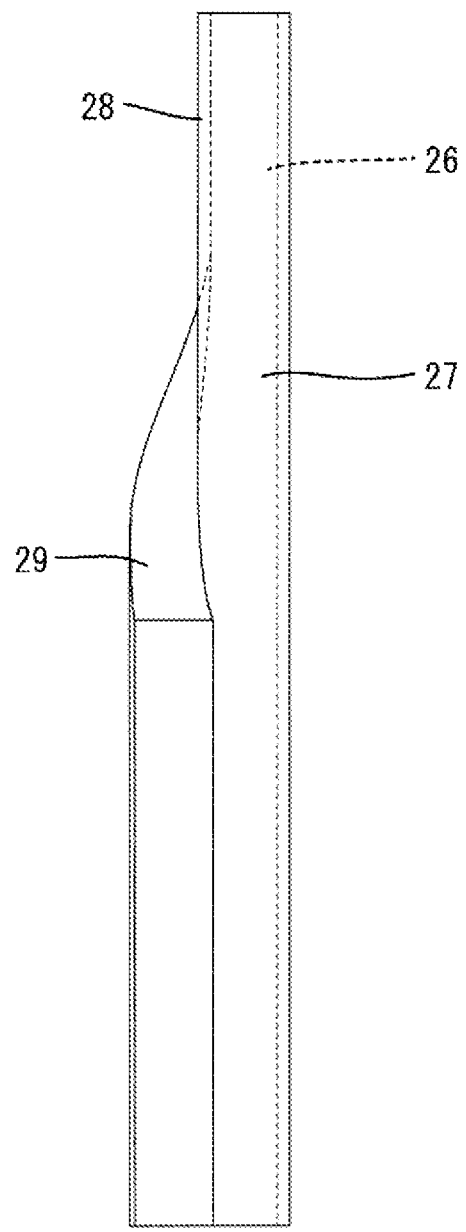
FIG. 16 is a front view schematically showing the tab insertion path and the cam portion.

As shown in FIGS. 15 and 16, the cam portion 27 is formed to communicate with each tab entrance path 26 over the entire length of the tab entrance path 26. The cam portion 27 is formed to have a thickness substantially equal to or slightly larger than a plate thickness of the follower portion 8 such that the follower portion 8 can be inserted therein. As shown in FIGS. 15 and 16, a part of the cam portion 27 from the entrance of the first terminal accommodating portion 16 (rear end of the housing 15) to a somewhat retreated position defines a straight portion 28 that extends straight along the front-rear direction. A spiral portion 29 is formed in a length range before the straight portion 28. The spiral portion 29 is formed to turn spirally about an axis of the tab entrance path 26. In this embodiment, a turning angle from the start to the end of the spiral is approximately 90°. The cam portion 27 is formed to reach a front end while maintaining a cross-sectional shape at the end of the spiral even before the end of the spiral.

Figure 12:
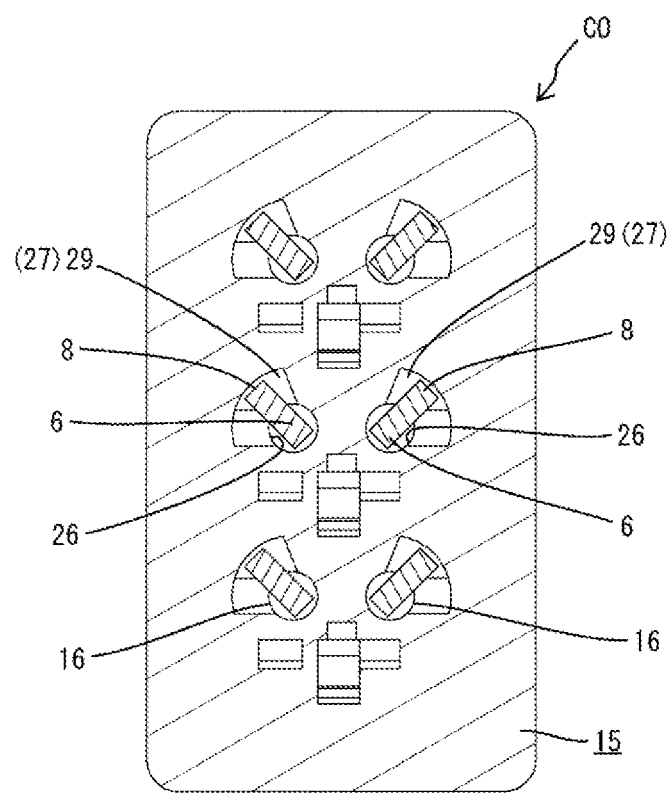
FIG. 12 is a section along B-B of FIG. 11.
Figure 14:
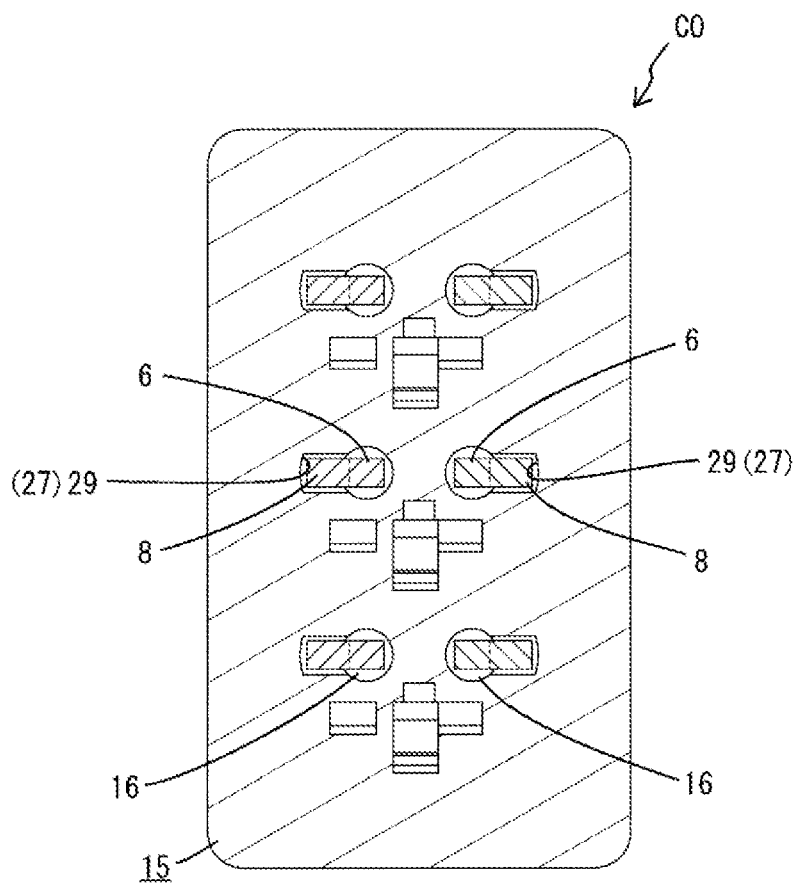
FIG. 14 is a section along C-C of FIG. 13.

Spirally turning directions are opposite between the first terminal accommodating portions 16 paired in the Y direction. For example, in FIGS. 10, 12 and 14, the turning direction is clockwise in the first terminal accommodating portion 16 located in the upper stage in the Y direction, whereas the turning direction is counterclockwise in the first terminal accommodating portion 16 located in the lower stage.

Figure 11:
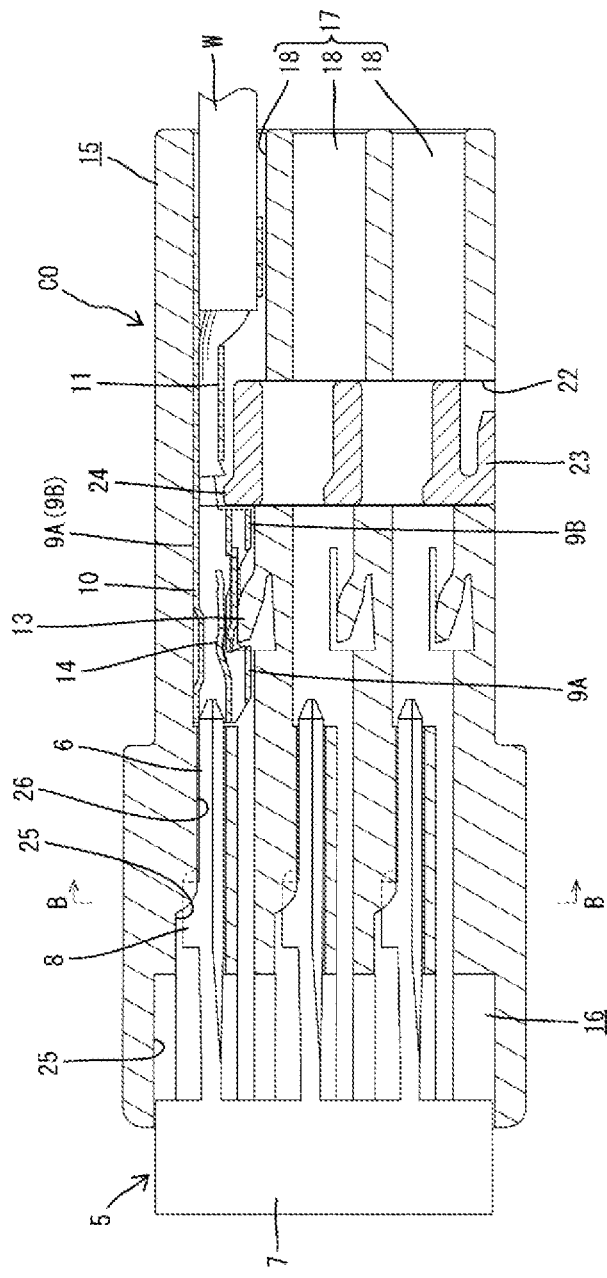
FIG. 11 is a front view in section showing a state where the joint terminal is inserted to an intermediate position into the first terminal accommodating portion of the housing.

In the process of inserting the joint terminal 5 into the first terminal accommodating portion 16 in this way, the follower portion 8 of each tab terminal 6 first moves forward along the straight portion 28 of the cam portion 27. Thus, the tab terminal 6 is not deformed. However, as shown in FIG. 11, when the follower portion 8 enters the spiral portion 29 of the cam portion 27, a front end part of the coupling piece 7 of the joint terminal 5 enters the coupling piece accommodating portion 25 and is sandwiched in a plate thickness direction. Thus, each tab terminal 6 is twisted and deformed about the axis thereof as the follower portion 8 moves along a spiral path of the spiral portion 29 thereafter. As a result, the follower portion 8 is shifted by approximately 90° in phase from the coupling piece 7. In other words, when the joint terminal 5 initially is inserted into the first terminal accommodating portion 16, a plate surface direction of the tab terminal 6 is along the Y direction. However, when the insertion of the joint terminal 5 into the first terminal accommodating portion 16 is completed, the plate surface direction of the tab terminal 6 is converted into the X direction.

Note that the follower portion 8 is located in a front end part of the spiral portion 29 and sandwiched in the plate thickness direction by facing inner wall surfaces of the spiral portion 29 in a state where the insertion of the joint terminal 5 is completed. Thus, a return from a state of twisting deformation (springback) is restricted.

Next, an example of the procedure of manufacturing the joint connector CO is described. First, the joint terminals 5 are accommodated into the first terminal accommodating portions 16. In that case, the respective follower portions 8 are inserted into the straight portions 28 of the corresponding cam portions 27 at the same time as the respective tab terminals 6 of the joint terminals 5 are inserted into the corresponding tab entrance paths 26 (see FIGS. 9 and 10).

When the joint terminal 5 is pushed directly, the front end part of the coupling piece 7 enters the entrance part of the coupling piece accommodating portion 25, as shown in FIG. 11. Thus, the coupling piece 7 is sandwiched in the plate thickness direction by facing wall surfaces in the coupling piece accommodating portion 25. On the other hand, since each follower portion 8 enters the entrance part of the spiral portion 29, the follower portion 8 receives a twisting force in a predetermined direction about an axial center of the tab terminal 6 from the inner surface (cam surface) of the spiral portion 29 as the joint terminal 5 is pushed.

The insertion of the joint terminal 5 is completed when the front end of the coupling piece 7 is butted against the back wall of the first terminal accommodating portion 16. At this time, both longitudinal side edges of the coupling piece 7 are press-fit to somewhat bite into the facing walls in the coupling piece accommodating portion 25. Therefore the entire joint terminal 5 is retained and accommodated in the first terminal accommodating portion 16. On the other hand, the follower portion 8 has reached the front end part of the spiral portion 29 by this time and each tab terminal 6 is twisted by 90° about the axis thereof until the follower portion 8 reaches here. As a result, the plate surfaces of each tab terminal 6 are initially facing in the Y direction, which is the same as the plate surface direction of the coupling piece 7, but each tab terminal 6 is twisted by 90° to convert the facing direction thereof into the X-direction when the accommodation of the joint terminal 5 is completed.

Next, connection of the main-line female terminals 9A and the branch-line female terminals 9B to the respective tab terminals of the joint terminal 5 is described.

As shown in FIG. 1, the main line 1 includes the bypass path 4 for each branch point 3 to each electronic control unit U. Each bypass path 4 is composed of the forward path 4A toward the joint connector CO and the return path 4B returning to the main line 1 again from the joint connector CO. The main-line female terminals 9A are connected respectively to end parts of the wires W constituting the twisted pair cable serving as the forward path 4A and end parts of the both wires W constituting the twisted pair cable serving as the return path 4B. Further, the branch-line female terminals 9B are connected respectively to end parts of the wires W constituting the twisted pair cable serving as the branch line to be connected to each electronic control unit U.

As shown in FIG. 1, the two main-line female terminals 9A connected to the respective end parts of the twisted pair cable constituting the forward path 4A of the bypass path 4 are inserted into the cavities 18 (cavities 18 are not shown in FIG. 1) on shown left ends of the second terminal accommodating portions 17 paired in the Y direction in FIG. 6 (note that the main-line female terminals 9A and the joint terminal 5 only on one side are shown in FIG. 1 for the convenience of drawing). Similarly, the two main-line female terminals 9A connected to the respective end parts of the twisted pair cable constituting the return path 4B of the bypass path 4 are inserted into the cavities 18 in shown central sides of the second terminal accommodating portions 17 paired in the Y direction. Further, the two branch-line female terminals 9B are inserted into the cavities 18 on shown right ends of the second terminal accommodating portions 17 paired in the Y direction. Note that, as described above, the retainer 23 is held at the partial locking position when the respective female terminals 9A, 9B are inserted into the cavities 18.

The respective female terminals 9A, 9B are inserted into the corresponding cavities 18 in this way are locked primarily by the locking lances 13. The retainer 23 then is moved from the partial locking position to the full locking position so that the respective locking projections 24 of the retainer 23 are locked to the rear ends of the terminal connecting portions 10 of the corresponding female terminals 9A, 9B. As a result, the respective female terminals 9A, 9B are retained doubly by the locking lances 13 and the retainer 23.

When the respective female terminals 9A, 9B are inserted properly into the corresponding cavities 18, as described above, the tab terminals 6 of the corresponding joint terminals 5 are inserted into the terminal connecting portions of the respective female terminals 9A, 9B. In this process, the tab terminals 6 slide in contact with the resilient contact pieces 14 while deflecting the resilient contact pieces 14, thereby being electrically connected. Since the resilient contact pieces 14 are in contact with the plate surfaces of the tab terminals 6 rather than the fracture surfaces thereof during this time, they are not damaged by the fracture surfaces.

By relaying the joint terminals 5 and the main-line female terminals 9A for forward path and return path in the bypass paths 4, as described above, the branch points 3 of the main line 1 are connected. The entire main line 1 is configured by connecting the respective branch points 3 in this way. Further, each electronic control unit U is connected while being branched off from the main line 1, by connecting the joint terminals 5 and the branch-line female terminals 9B at each branch point 3. By establishing a connection at each branch point 3 in this way, the in-vehicle network is configured to enable communication between the electronic control units U.

As described above, the pairs of female terminals 9A, 9B connected to the respective twisted pair cables constituting the main line 1 and the branch line 2 can be close to each other in the housing 15, i.e. intervals (intervals in the Y direction) between the corresponding cavities 18 can be narrowed. Thus, a high noise removal effect of the twisted pair cables can be maintained as it is even at a connected part to the connector. Further, in employing such a configuration, even if the positions of the locking lances 13 are changed, the resilient contact pieces 14 of the female terminals 9A, 9B are not brought into contact with the fracture surfaces of the tab terminals 6 of the joint terminals 5 and can be protected from damage since the tab terminals 6 are twisted by approximately 90° about the axes. In addition, since the tab terminals 6 are not twisted in advance and are twisted as being inserted into the housing 15 of the joint connector CO, manufacturing efficiency of the joint connector CO can be enhanced since there is no machining in advance.

Further, according to this embodiment, the follower portions 8 are located in the front end parts of the spiral portions 29 and sandwiched in the plate thickness direction by the facing inner wall surfaces of the spiral portions 29 in a state where the insertion of the joint terminal 5 is completed. Thus, each tab terminal 6 does not return from a twisted and deformed state (springback). Therefore, there also is obtained an effect that the tab terminals 6 can be held stably in contact with the plate surfaces of the resilient contact pieces 14 of the corresponding female terminals 9A, 9B.

The present invention is not limited to the above described and illustrated embodiment. For example, the following embodiments are also included in the technical scope of the present invention.

Although the tab terminals are twisted in the process of mounting the joint terminal into the first terminal accommodating portion in the above embodiment, the tab terminals may be, instead, twisted before being mounted into the first terminal accommodating portion.

Although the joint connector is applied to the in-vehicle network in the above embodiment, use applications should not be limited.

LIST OF REFERENCE SIGNS

5 . . . joint terminal
6 . . . tab terminal
7 . . . coupling piece
8 . . . follower portion
9A . . . main-line female terminal
9B . . . branch-line female terminal
14 . . . resilient contact piece
15 . . . housing
16 . . . first terminal accommodating portion
17 . . . second terminal accommodating portion
26 . . . tab entrance path
27 . . . cam portion
CO . . . joint connector

The invention claimed is:

1. A joint connector, comprising:
a joint terminal formed with a coupling piece and a plurality of tab terminals projecting in parallel from the coupling piece;
a plurality of female terminal fittings configured such that the respective tab terminals are insertable thereinto and each including a terminal connecting portion internally formed with a deflectable resilient contact piece to resiliently contact the tab terminal;
a housing formed with a first terminal accommodating portion configured such that the joint terminal is mountable therein and formed with a plurality of tab entrance paths into which the respective tab terminals are to be inserted and a second terminal accommodating portion including a plurality of cavities each coaxially facing the corresponding tab entrance path, configured such that the female terminal fitting is insertable therein and internally formed with a deflectable locking lance to be resiliently locked to the corresponding female terminal fitting, a deflection direction of the resilient contact pieces being the same as an arrangement direction of the tab terminals,
wherein each tab terminal in the joint terminal is formed to be twisted about an axis thereof and a plate surface direction of each tab terminal is substantially perpendicular to that of the coupling piece and substantially the same as the deflection direction of the resilient contact pieces.

2. The joint connector of claim 1, wherein each tab terminal is formed with a protruding follower portion, a cam portion spiral about an axis of the tab entrance path is formed to communicate with each tab entrance path, and the cam portion is formed to guide the follower portion, twist and deform each tab terminal about the axis thereof and be able to contact the resilient contact piece in the plate surface direction thereof as the joint terminal is mounted into the first terminal accommodating portion.

3. The joint connector of claim 2, wherein the cam portion is formed to be able to restrict a returning movement of the tab terminal in a direction opposite to a twisting direction by bringing a surface of the follower portion on a side opposite to the twisting direction into contact with an inner surface of the cam portion when the joint terminal is properly mounted into the first terminal accommodating portion.

4. The joint connector of claim 3, wherein:
at least a pair of the first terminal accommodating portions are provided in the housing, the joint terminal is mounted into each of the first terminal accommodating portions, pairs of the female terminals to be connected to the respective tab terminals of a pair of the joint terminals are connected to twisted pair cables, and the pairs of female terminals are mounted into pairs of the corresponding cavities in at least a pair of the second terminal accommodating portions provided in the housing; and
the deflection direction of the respective locking lances is set along the arrangement direction of the respective cavities constituting the respective second terminal accommodating portions.

5. The joint connector of claim 1, wherein:
at least a pair of the first terminal accommodating portions are provided in the housing, the joint terminal is mounted into each of the first terminal accommodating portions, pairs of the female terminals to be connected to the respective tab terminals of a pair of the joint terminals are connected to twisted pair cables, and the pairs of female terminals are mounted into pairs of the corresponding cavities in at least a pair of the second terminal accommodating portions provided in the housing; and
the deflection direction of the respective locking lances is set along the arrangement direction of the respective cavities constituting the respective second terminal accommodating portions.

* * * * *